US010162167B2

(12) United States Patent
Öttl et al.

(10) Patent No.: US 10,162,167 B2
(45) Date of Patent: Dec. 25, 2018

(54) IMAGE-INVERTING SYSTEM FOR A SIGHTING TELESCOPE

(71) Applicant: Swarovski-Optik KG., Absam (AT)

(72) Inventors: Peter Öttl, Mils (AT); Rudolf Nagiller, Kolsass (AT)

(73) Assignee: Swarovski-Optik KG. (AT)

( * ) Notice: Subject to any disclaimer, the term of this patent is extended or adjusted under 35 U.S.C. 154(b) by 0 days.

(21) Appl. No.: 15/446,333

(22) Filed: Mar. 1, 2017

(65) Prior Publication Data
US 2017/0255000 A1   Sep. 7, 2017

(30) Foreign Application Priority Data

Mar. 2, 2016  (AT) ................ A 50166/2016

(51) Int. Cl.
*F41G 1/38* (2006.01)
*G02B 7/02* (2006.01)
(Continued)

(52) U.S. Cl.
CPC ............. *G02B 23/16* (2013.01); *F41G 1/38* (2013.01); *G02B 7/021* (2013.01); *G02B 7/10* (2013.01);
(Continued)

(58) Field of Classification Search
CPC .......... G02B 23/16; G02B 7/021; G02B 7/10; G02B 15/14; G02B 23/00; G02B 25/001; G02B 27/0018; F41G 1/38
(Continued)

(56) References Cited

U.S. PATENT DOCUMENTS 1,950,166 A * 3/1934 Durholz .............. G02B 7/10
  352/140
4,172,634 A  10/1979 Thompson
(Continued)

FOREIGN PATENT DOCUMENTS

DE       29802977 U1   4/1998
DE   102011000404 A1   8/2012
(Continued)

OTHER PUBLICATIONS

Austrian Office Action for AT Application No. 501662016, dated May 16, 2017.
(Continued)

*Primary Examiner* — Frank G Font
(74) *Attorney, Agent, or Firm* — Lerner, David, Littenberg, Krumholz & Mentlik, LLP

(57) ABSTRACT

The invention concerns an image-inverting system for a sighting telescope, where the image-inverting system has at least two mutually displaceable lenses in a tube of the image-inverting system parallel to an optical axis of the image-inverting system, where displacement of the at least two displaceable lenses modifies the reproduction scale at which an image projected onto a first image plane of the image-inverting system is shown on a second image plane of the image-inverting system, where the at least two displaceable lenses are arranged in any position between the first and the second image plane, where a surface of the inside of a tube facing the optical axis having at least one absorption area with absorption zones for absorbing incident light and with sliding surfaces located between neighboring absorption zones for bearings of the at least two displaceable lenses, where the total area of the sliding surfaces is smaller than the total area of the absorption zones, where the at least one sliding surface is arranged at a different distance from the optical axis than the at least one absorption zone.

23 Claims, 5 Drawing Sheets

(51) Int. Cl.
  *G02B 7/10* (2006.01)
  *G02B 15/14* (2006.01)
  *G02B 23/00* (2006.01)
  *G02B 23/16* (2006.01)
  *G02B 25/00* (2006.01)
  *G02B 27/00* (2006.01)

(52) U.S. Cl.
  CPC ............. *G02B 15/14* (2013.01); *G02B 23/00* (2013.01); *G02B 25/001* (2013.01); *G02B 27/0018* (2013.01)

(58) Field of Classification Search
  USPC ....... 359/421, 422, 425, 601, 613, 614, 704, 359/826
  See application file for complete search history.

(56) References Cited

U.S. PATENT DOCUMENTS

| | | | | |
|---|---|---|---|---|
| 5,440,431 | A * | 8/1995 | Jeong | G02B 7/10 359/513 |
| 5,633,763 | A * | 5/1997 | Suzuki | G02B 7/102 359/601 |
| 5,973,861 | A | 10/1999 | Dross et al. | |
| 6,384,968 | B1 * | 5/2002 | Ito | G02B 7/20 359/385 |
| 6,437,924 | B1 * | 8/2002 | Azegami | G02B 7/10 359/601 |
| 9,529,185 | B2 | 12/2016 | Fiedler | |
| 2004/0263804 | A1 * | 12/2004 | Basey | F21V 7/0025 353/119 |
| 2009/0141346 | A1 | 6/2009 | Kammans | |
| 2012/0198749 | A1 | 8/2012 | Hasselbach et al. | |
| 2013/0077172 | A1 * | 3/2013 | Lin | G02B 7/10 359/601 |

FOREIGN PATENT DOCUMENTS

| | | |
|---|---|---|
| EP | 1746451 B1 | 6/2010 |
| JP | 2013137533 A | 7/2013 |

OTHER PUBLICATIONS

European Search Report for EP Application No. 17158694, dated Aug. 14, 2017.

* cited by examiner

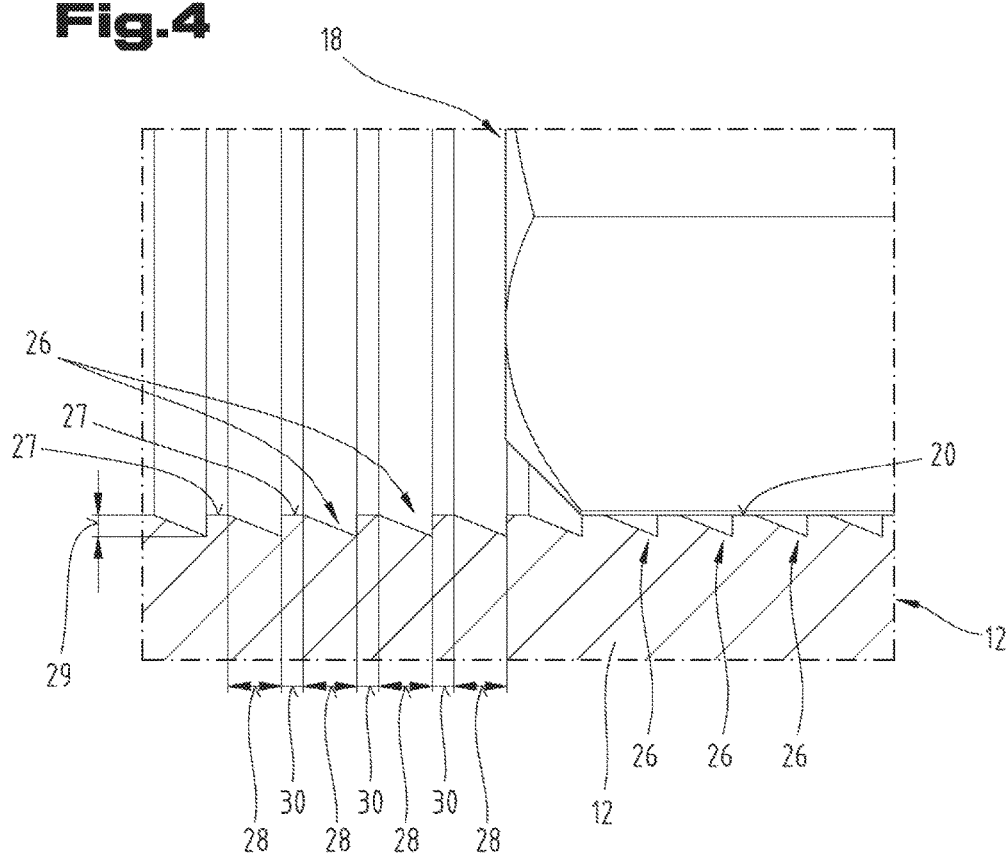
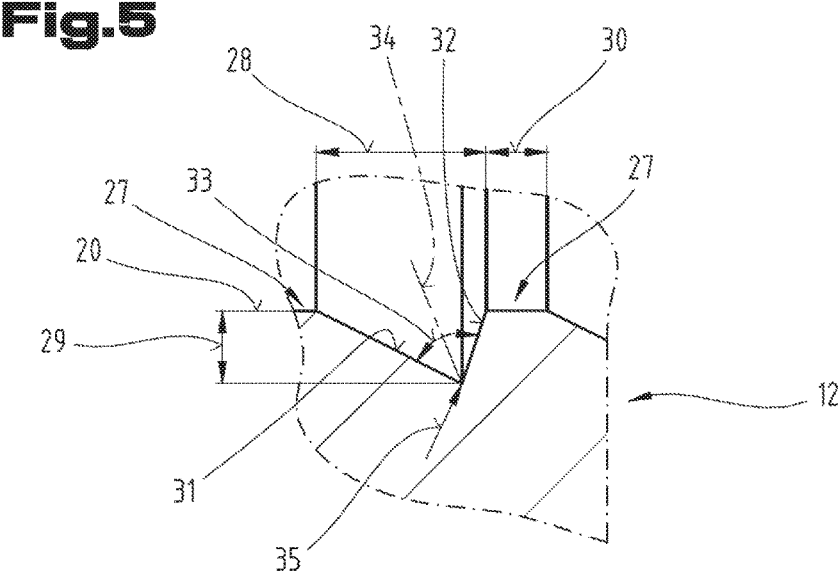

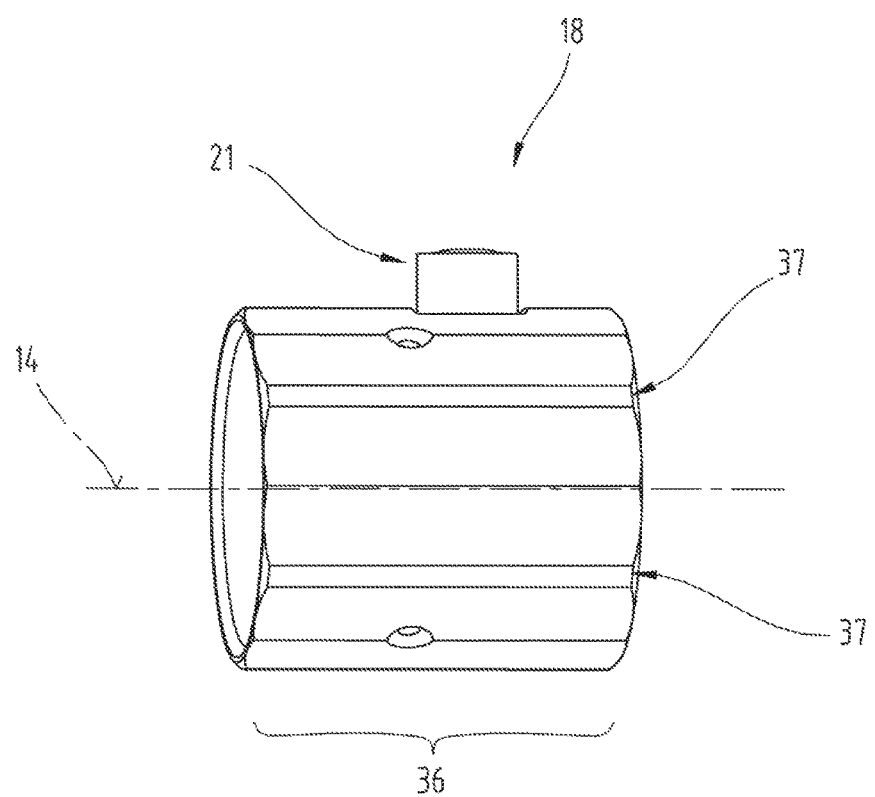

IMAGE-INVERTING SYSTEM FOR A SIGHTING TELESCOPE

CROSS-REFERENCE TO RELATED APPLICATIONS

The present application claims the benefit of Austrian Patent Application No. A50166/2016 filed Mar. 2, 2016; the disclosure of said application is incorporated by reference herein.

BACKGROUND OF THE INVENTION

The invention concerns an image-inverting system for a sighting telescope, where the image-inverting system has at least two mutually displaceable lenses positioned in at least one tube of the image-inverting system parallel to an optical axis of the image-inverting system, where displacing the at least two displaceable lenses can change the reproduction scale at which an image projected on a first image plane of the image-inverting system is reproduced on a second image plane of the image-inverting system, where the at least two displaceable lenses are arranged in any position between the first and the second image plane.

The invention further concerns a sighting telescope with an objective and an ocular and a central tube positioned between the objective and the ocular, with an image-inverting system placed inside the central tube, where the first image plane of the image-inverting system faces the objective and the second image plane of the image-inverting system faces the ocular, where an intermediate image projected by the objective on the first image plane is reproduced by the image-inverting system upright on the second image plane.

In the present context, reproduction scale means the ratio of the size of an image of an object on the second image plane of the image-inverting system divided by the size of the image of the object on the first image plane of the image-inverting system.

As an introduction, let it be noted that in this document the term lenses is intended to encompass both single lenses and lenses composed of multiple single lenses (cemented lenses). Such composite lenses can be created by, for example, gluing or cementing two or more single lenses together.

An image-inverting system and a sighting telescope of the type described at the outset are known from EP 1 746 451 B1. In the known image-inverting system, the magnification of the image-inverting system, i.e. the reproduction scale at which an image projected on the first image plane of the image-inverting system is reproduced on the second image plane is changed by displacing the lenses. Increasing the displacement of the lenses increased the zoom range of the known image-inverting system (i.e. the ratio of the maximum reproduction scale quantity-wise to the minimum reproduction scale quantity-wise). However, the increase in displacement entails a lengthening of the image-inverting system and therefore of the image-inverting system tube.

Because of this structural change, realisation of an image-inverting system with a large zoom and a large displacement range of the lenses can lead, especially at the higher magnification settings, to enlargement of the exposed part of the inside of the image-inverting system tube, where disruptive reflections of ambient light not parallel to the optical axis and incident on the image-inverting system can appear. The reflections have a particularly disruptive effect if the displaceable lenses of the image-inverting system are in a position corresponding to the largest magnification of the image-inverting system.

It is therefore an aim of the invention to create a solution that allows good suppression of disruptive light reflections, especially at higher values of the magnification settings, while maintaining a large range for modification of the reproduction scale of an image-inverting system.

BRIEF SUMMARY OF THE INVENTION

An image-inverting system of the type described at the outset according to this invention achieves this aim by furnishing the surface of the inside of the tube that faces the optical axis with at least one absorption area with absorption zones for absorbing incident light and with sliding surfaces positioned between neighboring absorption zones for bearings of the at least two displaceable lenses, where the total area of the sliding surfaces is smaller than the total area of the absorption zones, where the at least one sliding surface is placed at a different distance from the optical axis than the at least one absorption zone.

The absorption zone can be realised by a coating to increase absorption, for example a highly absorptive lacquer, or by application of absorptive surface structures or by deburring processing of the surface. The sliding surface, on the other hand, can be produced by, for example, smoothing the surface. The solution according to the invention permits very efficient suppression of reflections in the image-inverting system.

To ensure good ability to displace the displaceable lenses of the image-inverting system in the tube while also suppressing reflections, it can be specified that the ratio of the at least one absorption zone to the at least one sliding surface be greater than or equal to 2:1.

Particularly efficient suppression of reflections can be achieved by the at least one absorption zone having a distance from the optical axis that is more than 30 µm, especially 40 µm, larger or smaller than that of the at least one sliding surface.

A further development of the invention according to which sliding surfaces and absorption zones are placed alternately by turns in a longitudinal section of the inside of the image-inverting system tube parallel to the optical axis is advantageous insofar as such an orientation of the absorption area towards longitudinally and glancingly incident light is particularly effective.

According to a preferred variation of the invention it can be specified that the at least one absorption zone have at least one groove running diagonally to or across the optical axis, where the at least one groove in the surface of the tube facing the optical axis is formed by removing material forming one wall of the tube, where the sliding surfaces are formed of at least one stop ridge formed of material of the wall of the tube that has not been removed.

Optimal ability to displace the displaceable lenses along the tube without compromising the suppression of reflections can be achieved by the at least one stop ridge having a width with a value in a range between 0.05 mm and 0.5 mm.

According to an advantageous variation of the invention characterized by a further improvement in suppression of reflections, it can be specified that the at least one groove have a depth with a value in a range between 0.05 mm and 1 mm.

In addition, the at least one groove can have a width at its widest point with a value in a range between 0.2 mm and 0.3 mm.

According to a preferred variation of the invention, it can be specified that the at least one groove be formed as a screw-shaped or thread-like depression in one wall of the tube in the inner surface of the tube that faces the optical axis and running around the optical axis It is advantageous for the at least one screw-shaped circular groove to have a gradient with a value in a range between 0.2 mm and 2 mm.

Particularly good suppression of stray light can be achieved if an angle bisector of an opening angle of the at least one groove is slanted towards the first image plane of the image-inverting system.

Suppression of disruptive reflections from glancing incident light can be improved if the at least one groove has a leading edge in the direction of the first image plane and that merges into the least one stop ridge and a back edge running diagonally to the leading edge, where the leading edge and the back edge form an acute angle to each other and the leading edge or a tangent to the leading edge makes an angle with the optical axis with a value taken from a range between 20° and 24°. It has proven to be particularly advantageous if a transitional area between the back edge and the leading edge has a radius of curvature less than 0.05 mm.

However, in an alternative to the use of a screw-shaped groove, it can also be specified that the at least one absorption zone have multiple grooves placed one after another in the direction of the optical axis, especially self-contained grooves designed to run around the optical axis in ring form.

The tube preferably has a length with a value from a range between 80 mm and 150 mm. This is particularly advantageous for achieving a large adjustability range within which the reproduction scale of the image-inverting system can be changed.

To permit mounting of the image-inverting system in sighting telescopes with central tubes of conventional thickness, it can be specified that the tube whose optical axis-facing surface has the grooves have an external diameter that is smaller than 35 mm.

It is preferable that the position of the at least two moveable lenses that corresponds to the largest magnification of the image-inverting system have a value for the reproduction scale between the first and second image plane of the image-inverting system of at least 7, especially at least 8 (in terms of the absolute value of the reproduction scale, i.e. without considering the sign of the image size).

It can further be specified that in the position of the at least two moveable lenses that corresponds to the smallest magnification of the image-inverting system have a value for the reproduction scale between the first and second image plane of the image-inverting system of at least 0.9, especially at least 1 (also in terms of the absolute value of the reproduction scale).

Furthermore, in the position of the at least two moveable lenses that corresponds to the smallest magnification of the image-inverting system, the value of the reproduction scale between the first and second image plane of the image-inverting system can be a maximum of 1.2.

It has proven to be particularly advantageous in suppressing reflections on the inside of the tube for the at least one absorption zone be placed at least in one area that, in the positioning of the at least two displaceable lenses that corresponds to the largest reproduction scale at which the image projected onto the first image plane of the image-inverting system is shown upright and magnified on the second image plane of the image-inverting system, is located behind the at least two displaceable lenses, viewed from the direction of the at least two displaceable lenses.

To improve ability to displace the displaceable lenses in the tube, it can be specified that the surface of the inside of the tube facing the optical axis be coated, at least in parts, by a friction-minimising coating.

In addition, the surface of the inside of the tube facing the optical axis can be smoothed, especially by polishing, honing, sanding, or by a deburring process.

In a preferred embodiment of the invention, each bearing of the at least two displaceable lenses is executed primarily as a tubular sleeve, where an external sheath surface of each bearing has at least three stop ridges that support the bearing on the surface of the inside of the at least one tube facing the optical axis. It can further be specified that the at least one tube in which the two bearings of the lenses are placed in an axially displaceable manner have at least one longitudinal channel running parallel to the optical axis and placed in a guide rod that can be twisted around the optical axis, where the guide rod has at least two curved guide channels and each of the bearings has at least one tappet that engages both in the longitudinal channel and in one of the at least two guide channels, where the tappets of different bearings engage in different guide channels, where at least one reinforcing ring is placed touching the sheath surface of the guide rod such that it grasps the sheath surface in a ring. The lens bearings can be displaced in the longitudinal direction of the tube by turning the guide rod, changing the reproduction scale of the image-inverting system. The reinforcing ring significantly increases the mechanical stability of the guide rod and therefore of the image-inverting system as a whole. The embodiment of the invention described in this paragraph can also be realised without the presence of the absorption zones described above and can form the subject of a separate invention that solves the task of increasing the mechanical stability of a corresponding image-inverting system by the placement of a reinforcing ring.

In addition, the position of the first image plane and the position of the second image plane of the image-inverting system can be constant, independently of the current position of the at least two displaceable lenses, viewed in the direction of the optical axis.

The aforesaid task can also be solved with a sighting telescope of the type described above by this invention by providing it with an image-inverting system as per one of claims 1 to 22.

The objective of the sighting telescope in this invention preferably has a focal length with a value from a range between 45 mm and 49 mm.

The ocular of the sighting telescope in this invention can, for example, have a focal length with a value from a range between 45 mm and 49 mm.

In addition, the sighting telescope can have an exit pupil that is smaller than 4 mm, especially smaller than 3.5 mm.

In a preferred variation of the invention, it is specified that, at the smallest reproduction scale at which an intermediate image projected on the first image plane of the image-inverting system is shown on the second image plane of the image-inverting system, the sighting telescope have a total magnification with a value from a range between 0.7 and 10, where at the largest reproduction scale at which an intermediate image projected on the first image plane of the image-inverting system is shown on the second image plane of the image-inverting system, the total magnification of the sighting telescope have a value from a range between 6 and 80.

Furthermore, the central tube of the sighting telescope can have an external diameter that is less than or equal to 35 mm.

BRIEF DESCRIPTION OF THE DRAWINGS

To facilitate better understanding of the invention, it will be explained in detail using the figures below.

Extremely simplified, schematic depictions show the following:

FIG. 4 A detail of a grooved section of the image-inverting system from FIG. 3 with a first variation of grooves;

FIG. 5 A detail view as in FIG. 4 with a second variation of grooves;

FIG. 8 A perspective view of a sheath of the image-inverting system from FIG. 3 acting as a bearing for a displaceable lens.

DETAILED DESCRIPTION

In introduction, let it be noted that in the variously described embodiments, identical parts are provided with identical reference signs or identical component names, and that the disclosures contained in the description as a whole can be carried over analogously to identical parts with identical reference signs or identical component names. Likewise, positional information selected in the description, e.g. above, below, on the side, etc. refer to the directly described and depicted figure and if the position is changed, this positional information carries over analogously to the new position.

All information regarding ranges of values in this description should be understood to mean that these include any and all partial ranges, e.g. the statement 1 to 10 should be understood to mean that all partial ranges starting from the lower threshold 1 and the upper threshold 10 are included, i.e. all partial ranges begin with a lower threshold of 1 or larger and with an upper threshold of 10 or less, e.g. 1 to 1.7 or 3.2 to 8.1 or 5.5 to 10.

Figure 1:
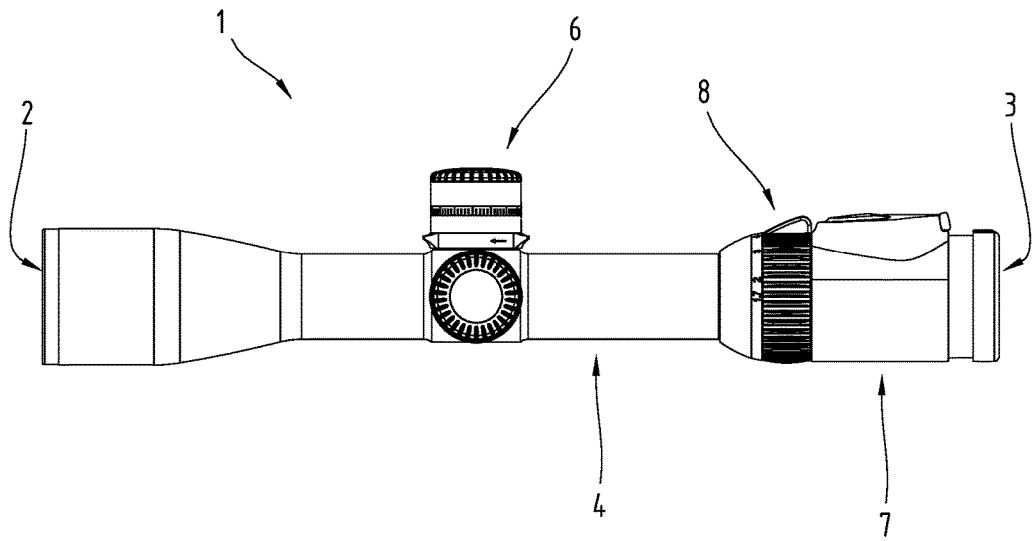
FIG. 1 A side view of a sighting telescope as in the invention.

FIG. 1 shows a side view of a telescope 1 with adjustable magnification. In this example embodiment, the telescope 1 is formed by a sighting telescope. In addition to an objective 2 and an ocular 3, the central tube 4 of the telescope 1 has an image-inverting system 5 consisting of lenses (FIG. 2).

Figure 2:
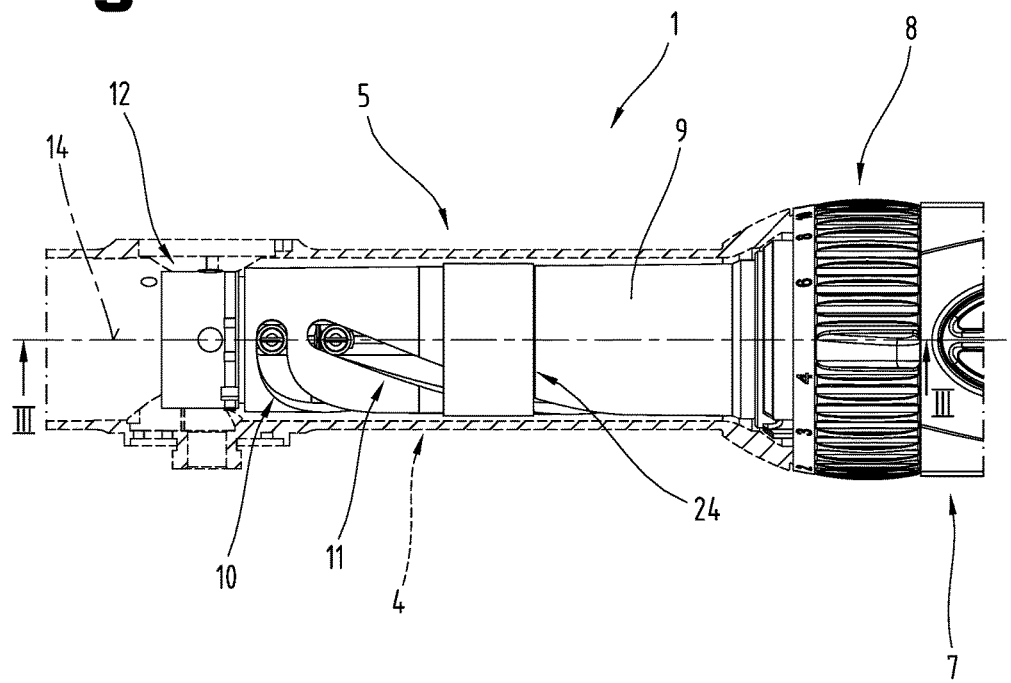
FIG. 2 A top view of an image-inverting system of the sighting telescope from FIG. 1, shown partially in section.

FIG. 2 depicts a detail of the sighting telescope 1 in FIG. 1 with a central tube 4 shown in section. The image-inverting system 5 is placed pivot-mounted inside the central tube 4 in a known manner, permitting adjustment of a cross-hairs when "zeroing in" together with a weapon. This adjustment/pivoting of the image-inverting system 5 in the central tube 4 of the telescope 1 also takes place in a known manner with the help of a top turret 6 (FIG. 1) and a side turret. For modification/adjustment of the magnification of the telescope 1, it has an adjusting ring 8 for zoom adjustment on the ocular-side end before an ocular housing 7. The adjusting ring 8 is rotationally coupled to a guide rod 9 of the image-inverting system 5. Guide channels 10, 11 formed in the guide rod 9 allow the adjustment of axially displaceable lenses of the image-inverting system 5 when the guide rod 9 is turned on an image-inverting system tube 12 (FIG. 3).

Figure 3:
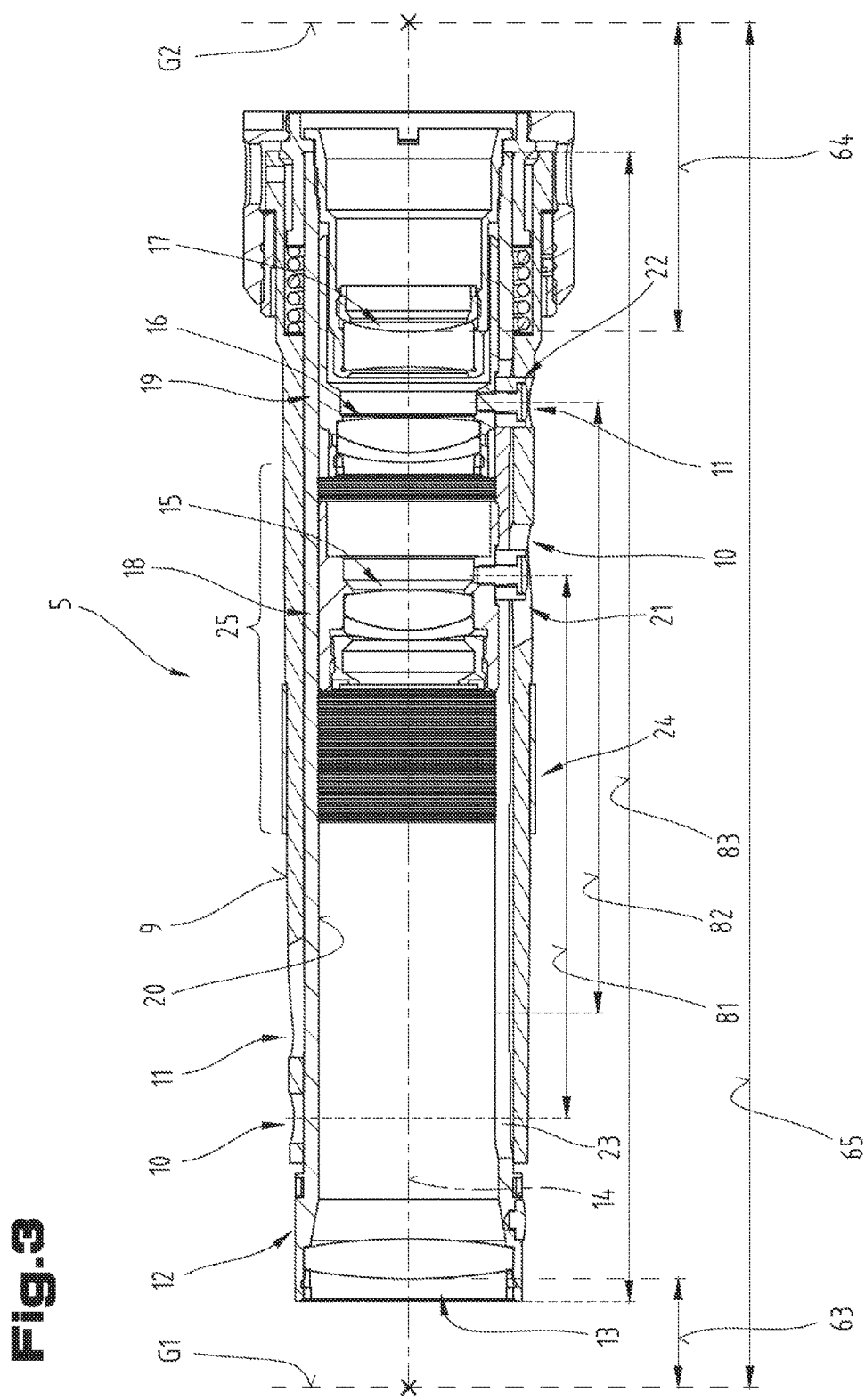
FIG. 3 A longitudinal section through the image-inverting system from FIG. 2.

FIG. 3 shows a longitudinal section of the image-inverting system 5 as per FIG. 2. The optical elements of this image-inverting system 5 produce both image-inverting/erecting of an image generated on an intermediate image plane 61 of the sighting telescope 1 on the objective side on an intermediate image plane 62 of the sighting telescope 1 on the ocular side. In addition, the optical elements of the image-inverting system 5 also allow adjustment of the reproduction scale between the first image plane 61 on the objective side and the second image plane 62 on the ocular side and therefore corresponding/proportional adjustment of the total magnification of the telescope 1 between a minimum total magnification and maximum total magnification. The optical elements of the image-inverting system 5 therefore simultaneously form a so-called zoom system.

As these optical elements, the optical system of the image-inverting system 5 comprise a field lens 13 placed in an end area of the image-inverting system 5 on the objective side. In the direction towards an ocular-side end area, a first zoom lens 15, a second zoom lens 16, and a diverging lens 17 follow along an optical axis 14. The two zoom lenses 15, 16 are each held in a bearing 18, 19 and are mutually displaceable along the optical axis 14. To achieve this, the two bearings 18, 19 are situated touching the inside 20 of the image-inverting system tube 12 and are displaceable in the direction of the optical axis 14.

Each of the bearings 18, 19 has a tappet 21, 22 protruding in the axial direction (in reference to the optical axis 14). These tappets 21, 22 extend through a longitudinal channel 23 formed in the image-inverting system tube 12 and into one of the two guide channels 10, 11 of the guide rod 9. In this way a cam mechanism is formed between the image-inverting system tube 12, the guide rod 9, and the two bearings 18, 19 with the zoom lenses 15, 16 by which the zoom lenses 15, 16 can be displaced in the axial direction. For this purpose, the curved shapes of the guide channels 10, 11 in the guide rod 9 are designed so that when the zoom lenses 15, 16 are displaced the position of the two intermediate image planes 61, 62 is not changed (at least for the limiting case of an image of an object at infinity).

In the example embodiment shown, the guide channel 10 determines a displacement range in the axial direction with a length 81 of approx. 55 mm for the bearing 18 and/or zoom lens 15. The guide channel 11 allows the zoom lens 16 and/or the second bearing 19 a range of movement with a length 82 of approx. 61 mm, where the image-inverting system tube 12 has a length 83 of 115.2 mm. In modified embodiments of the image-inverting system 5, the length 83 of the image-inverting system tube 12 can take values from a range between 80 mm to 150 mm.

The lenses of the image-inverting system 5 have the following focal lengths, in each case based on a wavelength of light of 546 nm. The field lens 13 has a focal length of +54.1 mm; the first zoom lens 15 a focal length of +37.8 mm; the second zoom lens 16 a focal length of +41.6 mm and the diverging lens 17 a (negative) focal length of −29.6 mm. The placement of the lenses relative to each other is chosen so that a distance 63 between the first image plane 61 and the field lens 13 has a value of 11.3 mm and a distance 64 between the diverging lens 17 and the second image plane 62 has a value of 30.8 mm, where an image plane distance 65 of the second image plane 62 to the first image plane 61 has a value of 137 mm.

In alternative embodiments of the image-inverting system 5, the values of the focal lengths can fall in the following ranges. The focal length of the field lens 13 between 44.1 mm and 64.1 mm; the focal length of the first zoom lens 15 between 27.8 mm and 47.8 mm; the focal length of the second zoom lens 16 between 31.6 mm and 51.6 mm and the focal length of the diverging lens 17 between −39.6 mm and −19.6 mm. Accordingly, the values of the aforesaid lengths and distances can be varied by +/−20%.

In the preferred embodiment of the invention, adjusting the zoom lenses 15, 16 along the optical axis 14 can produce a reproduction scale of a range between −1.038 (the smallest total magnification of the telescope 1) to −8.238 (the largest total magnification of the telescope 1), achieving a zoom factor with a value of 8.

Such high zoom factor values (compared to previously standard values of up to 4 or up to 6) necessitate high accuracy of fit of the guiding of the bearings 18, 19 in the image-inverting system 12, as well as high precision in the displacement of the bearings 18, 19 in the axial direction caused by the interaction of the tappets 21, 22 with the guide channels 10, 11 and/or the longitudinal channel 23. For this reason, a reinforcement ring 24 is further specified for the image-inverting system 5 which is arranged touching or affixed to the circumference of the guide rod 9.

As depicted in FIG. 3, fluting is specified on the surface of an area 25 or a longitudinal area of the surface of the inside 20 of the image-inverting system tube 12.

FIG. 4 shows a detail from the area 25 of the image-inverting system tube 12 with the bearing 18 as per FIG. 3 depicted extremely enlarged. The bearing 18 touches the inside 20 of the image-inverting system tube 12 and can be displaced in this way, sliding along the inside 20, in the longitudinal direction of the image-inverting system 5. As depicted in FIG. 4, the bearing 18 is located in the fluted area 25 of the inside 20 of the image-inverting system tube 12 (FIG. 3). Accordingly, channels 26 are moulded into the inside 20 of the image-inverting system tube 12. These grooves or channels 26 contribute to light incident on the inside 20 of the image-inverting system tube 12 not causing stray light that disrupts the image being viewed.

To avoid stray light, it is in general specified that the internal walls of lens mounts and optical housings be blackened (e.g. anodised in black). However, it occurs that, in particular with very smooth surfaces and very shallow or glancing angles of incidence of the light rays, blackening the surface alone is not sufficient. Incidentally, where this description speaks of "stray light," please refer to the standard measurement as per DIN ISO 11490-6 (Optics and photonics, testing procedure for telescopes, part 6: Specification of stray light proportion).

To suppress stray light, it can be provided that the area 25 of the inside 20 of the image-inverting system tube 12 be designed with a tightly placed succession of grooves or channels 26. As depicted in FIG. 4, the channels 26 are formed by circular or torus-shaped depressions in the inside 20 of the image-inverting system tube 12. The cross-section of the channel 26 is triangular in this case.

In an alternative embodiment, the channels 26 are formed by a screw-shaped or thread-shaped depression. The grooves or channels 26 in the area 25 of the inside 20 can also run diagonal to or across the optical axis 14 of the image-inverting system 5.

Each of the channels 26 forms an absorption zone for light rays incident on it. These channels 26 are preferably produced by removing some of the material forming the wall of the image-inverting system tube 12, for example through milling or lathing. This produces a succession of depressions/grooves forming the channels 26 and sliding surfaces 27 located between neighboring channels 26. In this example embodiment, the channels 26 are produced with a width 28 with a value of 0.25 mm and a depth 29 with a value of 0.1 mm. The width 30 of the sliding surfaces 27 between two neighboring channels 26 has a value of 0.1 mm. The ratio of the width 28 of a channel 26 to the width 30 of a sliding surface 27 is preferably larger than 1:1. It is beneficial for the light-absorbing effect if the area ratio of the channel 26 or the absorption zones is proportionally high. The choice of the width 28 of the channels 26 and the width 30 of the sliding surfaces 27 is favourable when the area content of the channel 26 to the area content of the sliding surface 27 has a ratio of larger than or equal to 2:1.

The area content of the channel 26 or absorption zone is understood as the value of the area of the channel 26 projected vertically onto the inside 20 of the image-inverting system tube 12. The given ratios should also be understood in this way and refer to the absorption area or the area 25 of the inside 20 of the image-inverting system tube 12. It is advantageous if the total area of the sliding surfaces 27 in the area 25 is smaller than the total area of the absorption zones 26.

The absorption zones predominantly have a 30 μm greater distance or radius from the optical axis 14 than the sliding zone 27.

It proves to be particularly advantageous if a longitudinal section parallel to the optical axis 14 of the inside 20 of the image-inverting system tube 12 has sliding surfaces 27 and absorption zones 26 placed alternately one after the other. This is because the reflection-suppressing effect of the absorption area on the inside 20 of the image-inverting system tube 12 is particularly effective for glancing light incident in the longitudinal direction.

FIG. 5 depicts a detail of the inside 20 of the image-inverting system tube 12 with an alternative cross-section shape of the channel 26. The channel 26 or absorption zone has a primarily triangular cross-section shape, bounded by a leading edge 31, a back edge 32, and the intended extension of the inside 20 of the image-inverting system tube 12. The leading edge 31 and the back edge 32 preferably enclose an angle 33 that forms an acute angle. Otherwise, the leading edge 31 forms an angle with the optical axis 14 (FIG. 3) whose value lies in a range between 20° and 24°. The leading edge 31 is the boundary surface of the channel 26 that is closer to the objective-side end of the image-inverting system 5 (FIG. 3), while the back edge 32 describes the boundary of the channel 26 that is closer to the ocular-side end area of the image-inverting system 5. The form of the channel 26 is further designed such that an angle bisector 34 of the angle 33 enclosed by the leading edge 31 and the back edge 32 is inclined in the direction of the objective-side end area or in the direction of the first image plane 61 of the image-inverting system 5. The leading edge 31 and the back edge 32 of the absorption zone or channel 26 form a kind of V-shape whose opening is oriented towards the light incident from the objective-side end area of the image-inverting system 5. The channel 26 is otherwise shaped by processing methods like milling or lathing such that a transitional area between the leading edge 31 and the back edge 32 has a radius of curvature 35 that is less than 0.05 mm.

Figure 6:
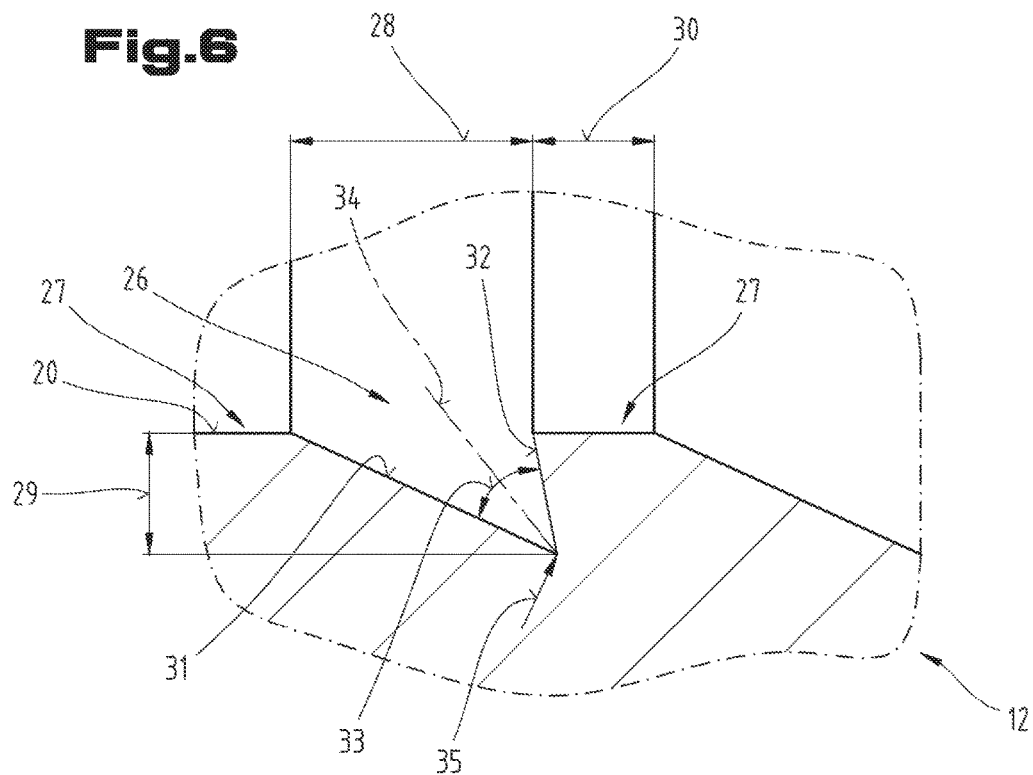
FIG. 6 A detail view as in FIG. 4 with a third variation of grooves.

It is particularly beneficial for avoiding the formation of stray light if the back edge 32 together with the optical axis 14 (FIG. 3) enclose an angle that is greater than 70°. An angle of 90° as in the example embodiment in FIG. 4, but also angles greater than 90° are possible. For an angle between the back edge 32 and the optical axis 14 of more than 90°, the sliding surface 27 is undercut as depicted in the example embodiment in FIG. 6.

Figure 7:
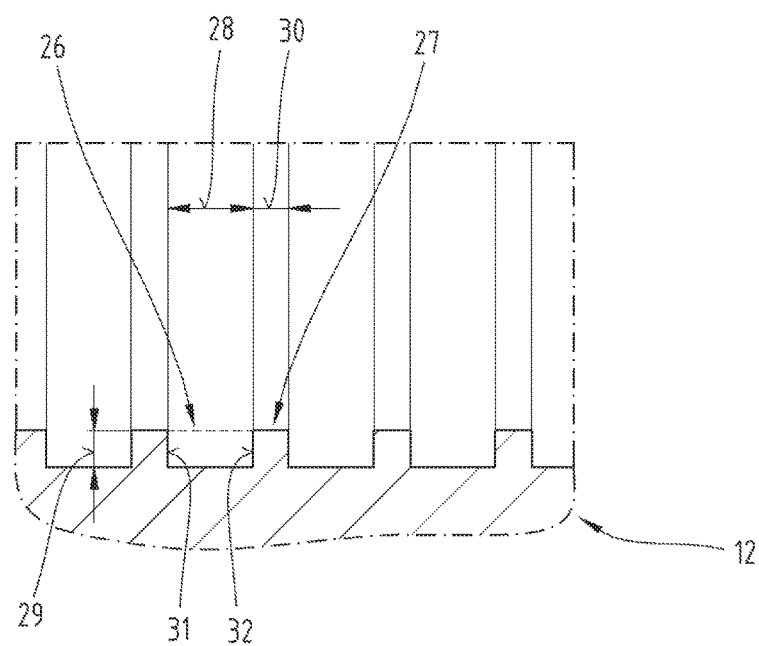
FIG. 7 A detail view as in FIG. 4 with a fourth variation of grooves.

FIG. 7 shows an additional example embodiment of the fluting in the area 25 of the inside 20 of the image-inverting system tube 12 as per FIG. 3. In this embodiment, the cross-sectional form of the channels 26 is rectangular, i.e. both the leading edge 31 and the back edge 32 enclose a right angle with the optical axis 14.

The following measurements/ranges of values in particular have proven to be beneficial in designing the fluting in the area 25 of the inside 20 of the image-inverting system tube 12. The width 30 of the sliding surfaces 27/the stop ridges between neighboring channels 26 is preferably taken from a range between 0.05 mm and 0.5 mm. The depth 29 of the grooves/channels 26 can take values from a range between 0.05 mm and 1 mm. The depth 28 of the channels 26 can take values from a range between 0.2 mm and 0.3 mm. If the channels 26 are designed as a thread-like or screw-like circular depression, the value of the gradient or the value of the pitch can be chosen from a range between 0.2 mm and 2 mm. During manufacturing of the image-inverting system tube 12, i.e. especially during manufacturing of the inside 20 and the section 25 of the image-inverting system tube 12 furnished with grooves, it is specified that a final processing step will hone the stop ridges/sliding surfaces 27 in order to ensure the most precise possible fit of the bearings 18, 19 with the two zoom lenses 15, 16.

FIG. 8 depicts the bearing 18 in perspective to represent both the bearings 18, 19. It has a largely cylindrical external form and has the tappet 21 protruding radially in respect of the optical axis 14 on its circumference or on a sheath 36. The sheath 36 of the bearing 18 deviates from an ideal enclosing cylindrical sheath insofar as glide stops 37 running parallel to the optical axis 14 are formed, where areas of the sheath 36 lying between two glide stops 37 have a smaller radius in respect of the optical axis 14 than the radius of the glide stops 37. The bearing 18 has at least three or more than three such glide stops 37, preferably distributed equally spaced over the circumference of the sheath 36 of the bearing 18. In the depicted example embodiment, the sheath 36 of the bearing 18 has six glide stops 37. When the bearings 18, 19 are installed in the image-inverting system tube 12, they are only in contact with the inside 20 or the gliding surfaces 27 of the image-inverting system tube 12 through their glide stops 37.

Otherwise, the image-inverting system 5 as per the invention can produce sighting telescopes 1 with a subjective visual field with a value greater than 23.0°, preferably with a value from a range of 23.5° to 24.5°. To achieve this, the image-inverting system 5 may e.g. be combined with an ocular 3 with a focal length value of 47.9 mm. An example value of the objective in this case might be 46.2 mm.

The example embodiments show possible variations; let it be noted at this juncture that diverse combinations of the individual variations of embodiments are possible and that this possibility of variation falls within the competence of a person active in this technical field based on the teaching regarding technical action provided by this invention.

The scope of protection is determined by the claims. However, the description and the drawings should be used to interpret the claims. Individual characteristics or combinations of characteristics from the depicted and described various example embodiments can constitute independent inventive solutions. The aim underlying the independent invented solutions can be taken from the description.

As a matter of form, let it be noted that, to facilitate a better understanding of the design, elements have in places been portrayed not to scale and/or enlarged and/or scaled-down.

| List of reference signs | | | |
|---|---|---|---|
| 1 | Sighting telescope | 31 | Leading edge |
| 2 | Objective | 32 | Back edge |
| 3 | Ocular | 33 | Angle |
| 4 | Central tube | 34 | Angle bisector |
| 5 | Reversing system | 35 | Radius |
| 6 | Top turret | 36 | Sheath |
| 7 | Ocular housing | 37 | Glide stop |
| 8 | Adjusting ring | 38 | |
| 9 | Guide rod | 39 | |
| 10 | Guide channel | 40 | |
| 11 | Guide channel | 61 | First image plane |
| 12 | Reversing system tube | 62 | Second image plane |
| 13 | Field lens | 63 | Distance |
| 14 | Optical axis | 64 | Distance |
| 15 | Zoom lens | 65 | Image plane distance |
| 16 | Zoom lens | 81 | Length |
| 17 | Stray light | 82 | Length |
| 18 | Bearing | 83 | Length |
| 19 | Bearing | 84 | |
| 20 | Inside | | |
| 21 | Tappet | | |
| 22 | Tappet | | |
| 23 | Longitudinal channel | | |
| 24 | Reinforcement ring | | |
| 25 | Area | | |
| 26 | Channel | | |
| 27 | Sliding surface | | |
| 28 | Width | | |
| 29 | Depth | | |
| 30 | Width | | |

The invention claimed is:

1. An image-inverting system for a sighting telescope, where the image-inverting system has at least two lenses arranged in a tube of the image-inverting system, where the at least two lenses are mutually displaceable parallel to an optical axis of the image-inverting system, where displacement of the at least two displaceable lenses modifies a reproduction scale at which an image projected onto a first image plane of the image-inverting system is shown on a second image plane of the image-inverting system, characterized in that a surface of the inside of the tube facing the optical axis has at least one absorption area, wherein the absorption area comprises absorption zones for absorbing incident light and sliding surfaces located between neighboring absorption zones, said sliding surfaces support bearings of the at least two displaceable lenses, where a total area of the sliding surfaces is smaller than a total area of the absorption zones, where a distance of the sliding surfaces relative to the optical axis differs from a distance of the absorption zones relative to the optical axis.

2. The image-inverting system according to claim 1, wherein a ratio of an area content of the at least one absorption zone and an area content of the at least one sliding surface is greater than or equal to 2:1.

3. The image-inverting system according to claim 1, wherein the at least one absorption zone has a distance from the optical axis that is at least 30 μm larger or smaller than that of the at least one sliding surface.

4. The image-inverting system according to claim 1, wherein a longitudinal section parallel to the optical axis of the inside of the tube has sliding surfaces and absorption zones placed alternately one after the other.

5. The image-inverting system according to claim 1, wherein the at least one absorption zone has at least one groove running diagonally to or across the optical axis, where the at least one groove in the surface of the tube facing the optical axis is formed by removing material forming one wall of the tube, where the sliding surfaces are formed of at least one stop ridge formed of material of the wall of the tube that has not been removed.

6. The image-inverting system according to claim 5, wherein the at least one stop ridge has a width with a value from a range between 0.05 mm and 0.5 mm.

7. The image-inverting system according to claim 5, wherein the at least one groove has a depth with a value from a range between 0.05 mm and 1 mm.

8. The image-inverting system according to claim 5, wherein the at least one groove has a width at its widest point with a value from a range between 0.2 mm and 2 mm.

9. The image-inverting system according to claim 5, wherein the at least one groove is formed by a screw-shaped depression in a wall of the tube on the inner surface of the tube that faces the optical axis and running around the optical axis.

10. The image-inverting system as per claim 9, wherein at least one screw-shaped circular groove has a gradient with a value from a range between 0.2 mm and 2 mm.

11. The image-inverting system according to claim 5, wherein an angle bisector of an opening angle of the at least one groove is slanted towards the first image plane of the image-inverting system.

12. The image-inverting system according to claim 5, wherein the at least one groove has a leading edge in the direction of the first image plane and that merges into the least one stop ridge and a back edge running diagonally to the leading edge, where the leading edge and the back edge form an acute angle to each other and the leading edge makes an angle with the optical axis with a value taken from a range between 20° and 24°.

13. The image-inverting system according to claim 12, wherein a transitional area between the back edge and the leading edge has a radius of curvature smaller than 0.05 mm.

14. The image-inverting system according to claim 5, wherein the at least one absorption zone has multiple grooves placed one after another in the direction of the optical axis.

15. The image-inverting system according to claim 1, wherein the tube has a length whose value comes from a range between 80 mm and 150 mm.

16. The image-inverting system according to claim 1, wherein the tube has an external diameter smaller than 35 mm.

17. The image-inverting system according to claim 1, wherein a value of the reproduction scale between the first and second image plane of the image-inverting system is at least 7 in the position of the at least two displaceable lenses that corresponds to the largest magnification of the image-inverting system.

18. The image-inverting system according to claim 1, wherein the value of the reproduction scale between the first and second image plane of the image-inverting system is at least 0.9 in the position of the at least two displaceable lenses that corresponds to the smallest magnification of the image-inverting system.

19. The image-inverting system according to claim 18, wherein the value of the reproduction scale between the first and second image plane of the image-inverting system is a maximum of 1.2, in the position of the at least two displaceable lenses that corresponds to the smallest magnification of the image-inverting system.

20. The image-inverting system according to claim 1, wherein the position of the at least two displaceable lenses that corresponds to the largest reproduction scale at which the image projected on the first image plane of the image-inverting system is shown upright and magnified on the second image plane of the image-inverting system, the at least one absorption area is located behind the at least two displaceable lenses when viewed from the direction of the at least two displaceable lenses.

21. The image-inverting system according to claim 1, wherein each of the bearings of the at least two displaceable lenses is executed as a tubular sleeve, where at least three glide stops are arranged on the external surface of each bearing to support the particular bearing on the surface of the inside of the tube that faces the optical axis.

22. The image-inverting system according to claim 21, wherein the tube whose surface facing the optical axis has the at least one absorption zone has at least one longitudinal channel running parallel to the optical axis and placed in a guide rod that can be twisted around the optical axis, where the guide rod has at least two curved guide channels and each of the bearings has at least one tappet that engages both in the longitudinal channel and in one of the at least two guide channels, where the tappets of different bearings engage in different guide channels, where at least one reinforcing ring is placed touching the sheath surface of the guide rod such that it grasps the sheath surface in a ring.

23. The image-inverting system according to claim 1, wherein the position of the first image plane and the position of the second image plane of the image-inverting system are constant, independently of the current position of the at least two displaceable lenses, viewed in the direction of the optical axis.

* * * * *